Jan. 11, 1938. J. D. SOEHNER ET AL 2,105,132
TORQUE ARM AND SIMILAR STRUCTURAL MEMBERS
Filed May 13, 1936 3 Sheets-Sheet 1
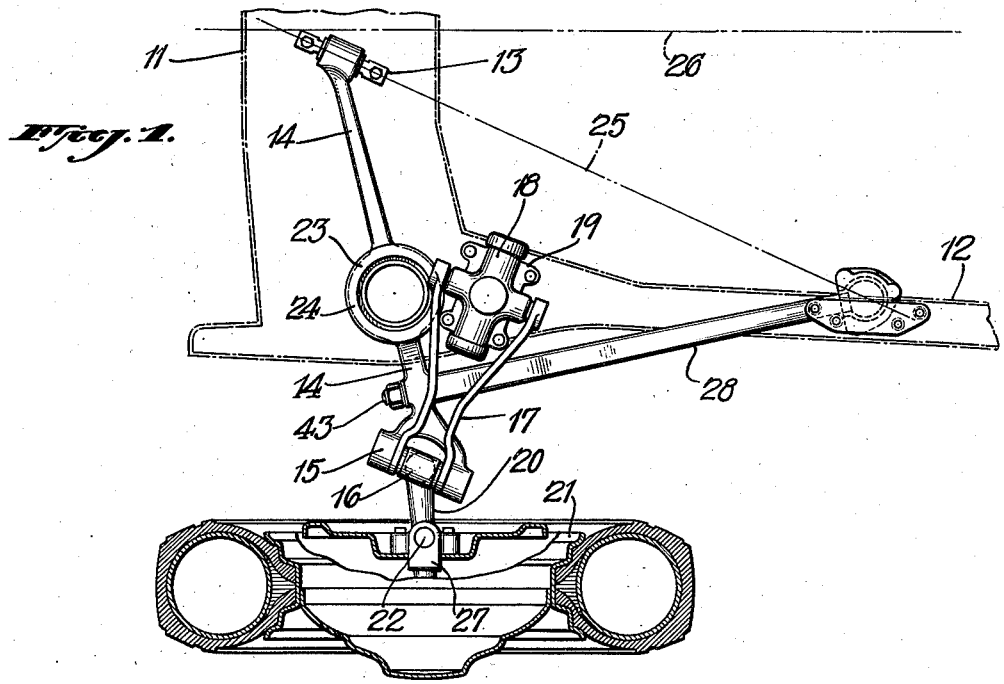
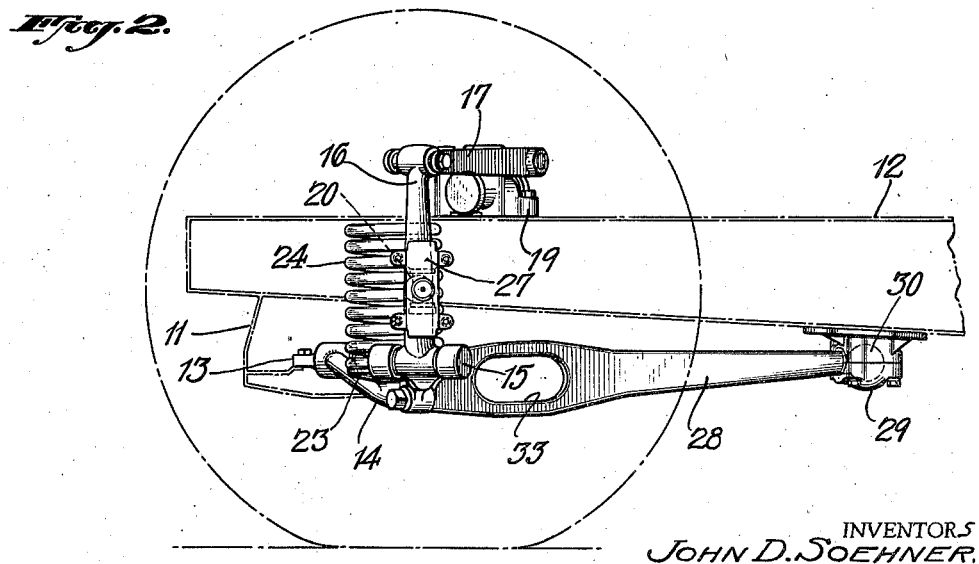
INVENTORS
JOHN D. SOEHNER.
HENRY S. HOLMES
BY
ATTORNEYS

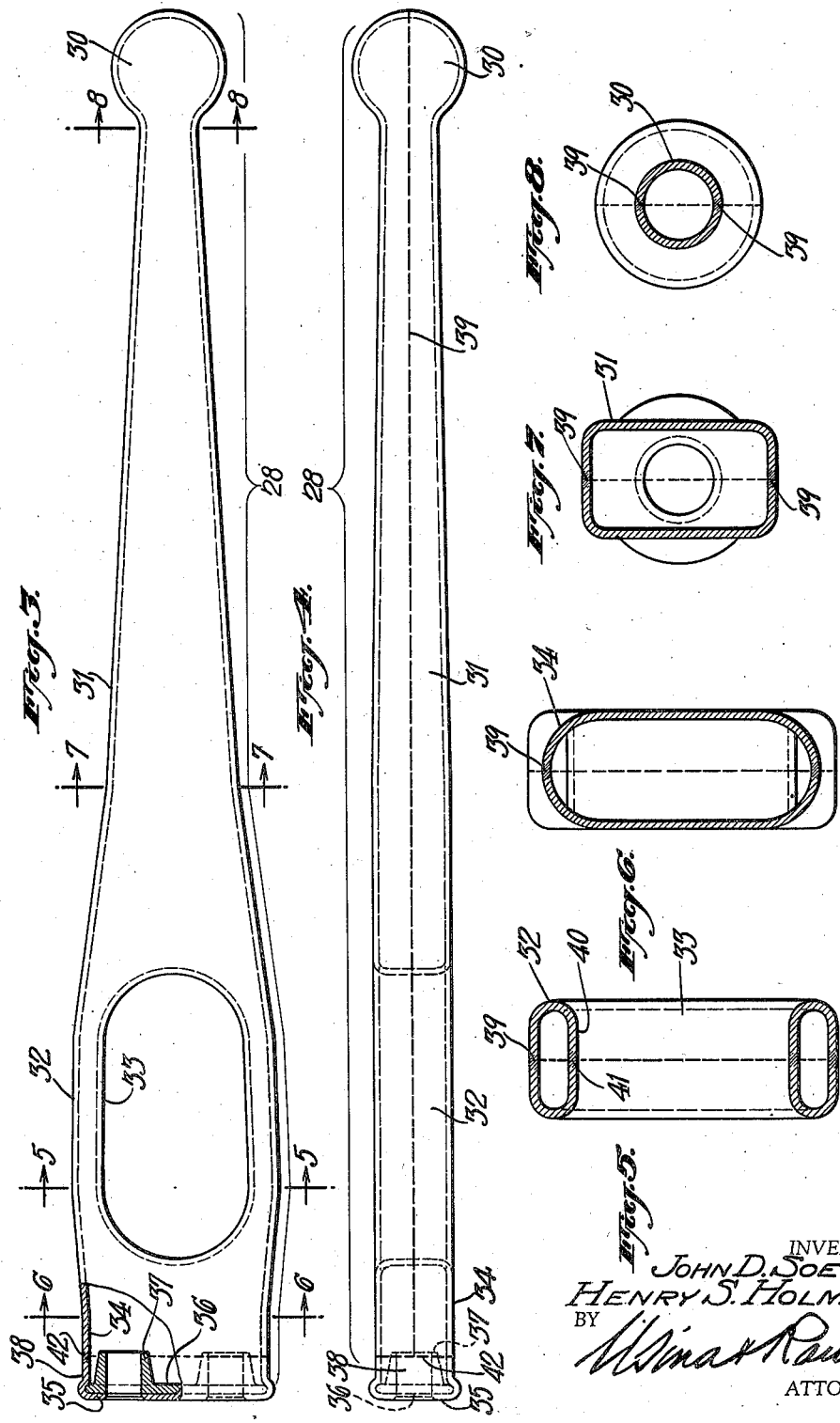

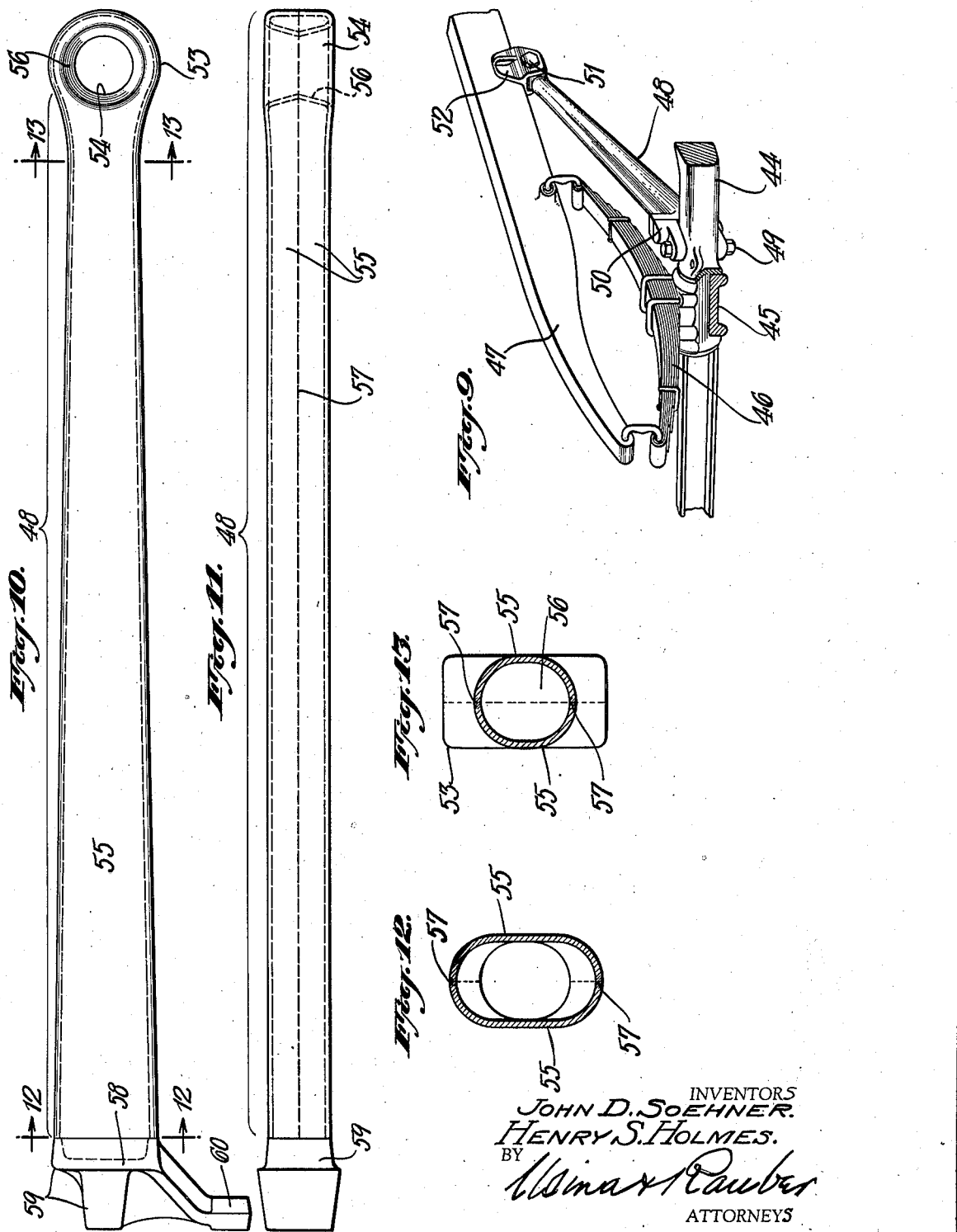

Patented Jan. 11, 1938

2,105,132

UNITED STATES PATENT OFFICE 2,105,132

TORQUE ARM AND SIMILAR STRUCTURAL MEMBER

John D. Soehner, Valley Stream, and Henry S. Holmes, Brooklyn, N. Y., assignors to Metropolitan Engineering Company, Brooklyn, N. Y., a corporation of New York Application May 13, 1936, Serial No. 79,482

13 Claims. (Cl. 267—66)

In the front suspension of automobiles it is common to connect the axle or other wheel-carrying member to the chassis frame by torque arms or rods. The frame being spring supported on the axle and certain play between frame and axle being desirable, such torque arms have been made with rocking connections at their inner ends, the outer ends being connected to the axle. They are subjected to severe strains in use and have been made of drop forged steel of considerable weight and of complicated design, particularly at the ends.

The present invention provides a construction for such torque arms and similar structural members, which is simple and economical to manufacture and which accomplishes a considerable reduction in weight compared with the prior forgings of equal strength and stiffness.

The accompanying drawings illustrate embodiments of the invention.

Fig. 1 is a plan partly in section of the torque arm and related parts of a front suspension. Fig. 2 is a side elevation of the same. Fig. 3 is a side elevation partly in section of the torque arm of Fig. 1. Fig. 4 is a plan of the same. Fig. 5 is a section on the line 5—5 of Fig. 3. Figs. 6, 7 and 8 are similar sections on the correspondingly numbered lines of Fig. 3. Fig. 9 is a perspective view of another type of suspension. Fig. 10 is a side elevation of the torque arm of Fig. 9. Fig. 11 is a plan view of the same. Figs. 12 and 13 are cross-sections of Fig. 10 on the correspondingly numbered lines.

Referring to Figs. 1 and 2, the chassis frame comprises a cross member 11 at the front and a pair of side members 12, only one being shown in the drawings. The cross member 11 is depressed at the center as indicated in Fig. 2 and carries a bearing member 13 on which is pivoted the inner end of a wheel-carrying member 14. The outer end of the member 14 is a forked bearing portion 15 in which rocks the lower end of an upright member 16, the upper end of which is connected by links 17 to a block 18 mounted on a bracket 19 on the frame. The upright rod 16 has an arm 20 extending outward and carrying the bearing for the wheel 21, which bearing is arranged to rock about a pivot 22 in the steering of the car. The wheel-carrying member 14 has a plate 23 constituting an enlargement of its width at an intermediate point which engages the lower end of a spring 24 pressing at its upper end against the underside of the frame. Thus, as the wheel rides over bumps in the road, it is pressed upward against the yielding resistance of the spring 24, its upward movement being a pivotal one about the bearing member 13. The axis 25 of this bearing is oblique to the lengthwise axis of the car, the center line of which is indicated at 26.

The shaft on which the wheel bearing is mounted is carried by a block 27 which pivots about the pin 22 to permit steering by the usual mechanism including a steering rod (not shown) passing laterally through an opening 33 in the torque arm. The torque arm indicated as a whole by the numeral 28 has its outer end fastened to the wheel-carrying member 14 near the outer end of the latter. As the wheel moves up and down over the inequalities of the road, the outer end of the wheel-carrying member 14 moves in an arc about the axis 25. The entire torque arm, therefore, must turn slightly about its own longitudinal axis. The torque arm locates and keeps the front wheel under the automobile. The horizontal component of the braking force is taken by the torque arm, which is in compression when stopping from a forward direction and in tension when stopping from reverse. To permit the rocking movement of the outer end the torque arm has its inner end set in a socket 29 mounted on the underside of the longitudinal member 12 of the frame so designed as to permit this end of the torque arm to accommodate itself to the rocking and twisting movements impressed upon its outer end and also to take the tension and compression stresses referred to.

Because of the special connections required and of the stresses which they must be designed to resist, such torque arms have generally been made as forgings of complicated shape.

According to the present invention they are made of a simpler construction, calling for a cheaper method of manufacture and serving also to effect a reduction in weight, compared with the prior practices.

In the design of Figs. 3 to 8 the complete torque arm includes a spherical inner end, an intermediate body portion and an outer end which is reinforced for rigid attachment to the wheel-carrying member of the assembly. The inner end 30 is a hollow sphere. The intermediate portion is a single tubular member 31 merging into a pair of tubular members 32 which are spaced apart to enclose a transverse opening 33 for the steering rod and which merge into a single tubular member 34. The outer member comprises a cup-shaped piece of sheet steel, or other suitable metal 35, on the inner face of which is a reinforcing member 36 comprising a pair of nuts 37, about which reinforcing member the sheet metal cup is crimped in so as to hold the two together, leaving a projecting flange 38 surrounding the member. In the manufacture of this torque arm, the invention makes use of segments of sheet metal with edges bent up and welded together, to form continuous joints around an entirely closed box-like structure. The complete closure has the advantage of preventing the entrance of moisture and preventing or eliminating corrosion within.

Figs. 3 to 8 illustrate a suitable structure and a simple method of production. The hollow enlarged spherical end 30 and the intermediate parts 31, 32 and 34 are made in the form of a single long tubular shape by first providing two segments divided along the central vertical plane, each segment including half of the spherical end and of the full length of the body. These two segments are then welded together along the top and bottom edges 39. In forming the segments, they are pierced and flanges 40 (Fig. 5) are struck up which surround the transverse opening 33 when the segments are brought together; preferably also these flanges 40 are welded as at 41 to complete the closure.

Figs. 5, 6 and 7 show that the body of the arm is of greater height than width throughout the major portion of its length, varying from circular at the inner end to more than two-to-one at the outer end. At the portion of the length which carries the transverse opening 33, the total depth of the arm is increased over that of the adjacent portions. In cases where such a transverse opening is not needed, such an increase of depth is unnecessary.

The outer end piece 35 is abutted against the end of the body and welded around the periphery of the joint 42 between the flange 38 and the end portion 34 of the body. The tapping and threading of the nuts, with the threads extending through the end 35 of the arm may be effected after the welding of the parts together. Or the nuts may be threaded beforehand and the end 35 perforated to permit the passage of the bolts. The bolts 43, Fig. 1, pass through the wheel-carrying member 14 and into the nuts 37 in the reinforcing plate within the torque arm and fasten the outer end of the latter rigidly to said member.

The above description applies to cars which have the two wheels carried by axles or shafts which are independently movable vertically.

Figs. 9 to 13 illustrate a design in which both wheels are mounted on the same axle 44 which is free to rock in saddle bearings 45 which are fast to the middle portions of springs 46 connected by the usual shackles to side members 47 of the chassis frame. In this case torque arms 48 are provided for positively guiding the movement of the axle, permitting it to rise and fall freely, to shift laterally and to deviate from the horizontal position on uneven roads. The axle carries pins 49 mounted to pivot in a block 50 which is rigidly attached to the outer end of the torque arm or rod. The rigid connection in this case is not directly to the axle, as in Fig. 1, but to the block 50 which is pivoted to the axle to permit side sway. A rubber bushed pivot 51 carried in a bracket 52 on the frame constitutes a pivot bearing for the rear end; so that this can pivot to permit vertical movement and can yield sufficiently to accommodate a certain amount of side sway of the axle. The torque rods hold the axle in position and take the strains in substantially the same way as in the design of Figs. 1 and 2, leaving it the sole duty of the springs to support the weight of the car flexibly.

For this sort of torque arm, the design and method of construction of Figs. 10 to 13 is suitable. The inner end 53 is a ring or hollow annulus with a transverse opening 54 which is flared to permit sidewise movement in addition to the vertical pivotal movement. The body 55 is of the tubular oblong cross-section illustrated in Figs. 12 and 13, flaring somewhat from the inner to the outer end. Two segments are used with flanges 56 struck up around openings near the inner end to enclose the transverse pivot opening 54. The segments are then welded at the top and bottom edges 57 making the inner end piece and the body into a unitary structure. The depth of this torque arm is less than that illustrated in Fig. 3 and a brake rod may pass above or below it, but a transverse opening could be provided in it similar to that in Fig. 3 for a brake rod or other intersecting member of the assembly.

The outer end in this case is a drop forging comprising a plate 58 with a flange 59 around its periphery fitting on the end of the body portion 55 and welded thereto to complete the closing of the box-like structure. At the outer side of the plate 58 are extensions 59 and 60 which may be tapped and threaded or similarly worked to secure a tight bearing and a rigid attachment to the pivot block 50 for the axle.

The principle described may be applied to torque arms and other structural members which are subjected to similar strains, simplifying and economizing their manufacture and providing the necessary stiffness against torque and rigidity in holding the wheel-carrying member in place under all circumstances while at the same time saving considerable weight. The closed box shape with rounded corners has also the advantage of a smooth attractive exterior surface which is easy to clean and to protect from rusting by rustproof coatings.

The stampings are blanked and drawn up from sheet metal in the ordinary ways. The finished edges of the segments may be welded simultaneously throughout their entire length; as, for example, by the Murray method of butt welding, the flash or burr being removable inexpensively. The end cap is blanked and first drawn up into a straight sided cup into which the reinforcing member, which may be a light forging, is inserted. A simple press operation brings the flanges around the edge of the forging to firmly hold the latter against the flat bottom of the cap. The welding of the flange of the cap with the forging within it, to the end of the hollow arm may be carried out by the Murray butt welding method or in the ordinary flash welding operation, both of which are simple, rapid and cheap.

The opening 33 in the torque arm of Fig. 3 is provided so as to have clearance for a steering rod. It serves also to reduce the total weight of the arm and one or more such openings may be provided for this purpose alone. Saving in weight is important because these torque arms are part of the unsprung weight of the car. Lightness particularly on the outer end is important. And the invention is particularly directed to reducing the weight at this outer end. The shell is made of the minimum thickness for the required strength and the forging is small and light, providing just enough metal to have the required strength after the bolt holes are tapped.

Although the sheet metal is shown of the same gauge throughout, the principle of construction makes it possible to use a comparatively heavy metal in the cap where additional thickness is needed, and a comparatively light metal in the body and inner end of the arm where these parts are sufficiently strong. The ball end of the arm mounted in rubber to provide for a limited angular motion in all directions, without lubrication, cannot rattle and serves its purpose admirably. The ball (or annulus, Fig. 10) is made very cheaply because of its formation and its integrality with the segments of the body. It requires no extra pressing nor welding operation.

The side walls surrounding the openings through the arm meet and are welded at the center at the same time that the outer edges are being welded. The flash may also be trimmed at the same time in the center as at the exterior. However, these walls around the openings may be made of less height so that when the segments are welded along their outer edges the walls around the openings meet, or nearly meet, but do not weld. Welding is preferable as it stiffens the arm, increases its strength and prevents dirt or water from entering the arm where it might start corrosion.

The end cap could be resistance butt welded or could be fusion welded to the arm proper. Flash weld is preferred at this point. In this method it is possible to get satisfactory results, clamping the parts less firmly and having less area of contact between the electrodes and the work.

The cap of Fig. 3 might be eliminated by substituting a forging of such size and shape as to take the place of the combined cap and reinforcement, but such a forging would be more expensive. Such a forging, welded to the arm is shown in Fig. 10.

Various other modifications may be made by those skilled in the art without departing from the invention as defined in the appended claims.

What we claim is:

1. A hollow torque arm or similar structural member including two segmental halves of thin metal welded together, said member having an opening through it, and a continuous wall around said opening formed by flanges bent up from said segments, the portion of said member which includes said opening being of increased depth over that of the adjacent portions.

2. A hollow torque arm or similar structural member comprising two segments of thin metal welded together and a third cup-shaped piece of thin metal with its edges welded to the first two parts.

3. A hollow torque arm or similar structural member comprising two segments of thin metal welded together and a third cup-shaped piece of thin metal with its edges welded to the first two parts and a fourth part secured within said third member.

4. A torque arm or similar structural member the middle portion of which comprises a pair of spaced apart tubular members and the ends of which comprise single tubular members merging into the first two, the middle portion being of increased depth over that of the adjacent portions.

5. A torque arm for automobiles having an inner rocking end for attachment to a bearing on the frame and an outer heavy end for rigid attachment to a wheel-carrying member, the body of said torque arm being a hollow box comprising thin metal segments welded together along their edges and the outer end portion comprising a reinforced member with edges welded to the body.

6. A torque arm for automobiles having an inner rocking end for attachment to a bearing on the frame and an outer heavy end for rigid attachment to a wheel-carrying member, the body of said torque arm being a hollow box comprising thin metal segments welded together along their edges, said segments having bent up flanges at an intermediate point in their length which when the segments are welded constitute a wall surrounding an opening through the body, the portion of the arm which includes said opening being of increased depth over that of the adjacent portions.

7. A torque arm for automobiles having an inner rocking end for attachment to a bearing on the frame and an outer heavy end for rigid attachment to a wheel-carrying member, the body of said torque arm being a hollow box comprising thin metal segments welded together along their edges and the outer end portion comprising a reinforced member with edges welded to the body, the reinforcement of said end portion comprising a separate member on the inner face of said end portion and held in place by the sides thereof.

8. The combination with an automobile frame of a wheel-carrying member on which said frame bears yieldingly and a torque arm having an inner end attached with a rocking engagement to a side portion of the frame and an outer end attached to said wheel-carrying member, said torque arm being a hollow box comprising thin metal segments extending from the outer end portion to and including the rocker end and welded together along their edges.

9. The combination with an automobile frame of a wheel-carrying member on which said frame bears yieldingly and a torque arm having an inner end attached with a rocking engagement to a side portion of the frame and an outer end attached to said wheel-carrying member, said torque arm being a hollow box comprising thin metal segments welded together along their edges and extending from the outer end portion to and including the rocker end and a separately formed outer end portion welded to the ends of said segments.

10. The combination with an automobile frame of a wheel-carrying member on which said frame bears yieldingly and a torque arm having an inner end attached with a rocking engagement to a side portion of the frame and an outer end attached to said wheel-carrying member, said torque arm being a hollow box comprising thin metal segments welded together along their edges and having also inner bent up flanges which when the segments are welded constitute a wall surrounding an opening through the arm, to accommodate a steering rod extending through said opening, the portion of the arm which includes said opening being of increased depth over that of the adjacent portions.

11. The combination with an automobile frame of a wheel-carrying member on which said frame bears yieldingly and a torque arm having a body portion which is a hollow closed box, and having an inner end attached with a rocking engagement to a side portion of the frame and having an outer end portion, and a nut by which the torque arm is attached to said wheel-carrying member, said nut being enclosed and rigidly held in said end portion of the arm.

12. A torque arm or similar structural member in the form of a hollow box comprising sheet metal segments of minimum thickness for the required strength welded together at the edges to form continuous stiffening joints which entirely close the box and prevent the entrance of dirt or water, and a reinforcing piece enclosed within said box at an end thereof for connecting the same to an adjacent part.

13. A torque arm for automobiles having an inner rocking end for attachment to a bearing on the frame and an outer heavy end for rigid attachment to a wheel-carrying member, the entire length of said torque arm being made in the form of a hollow box comprising sheet metal segments of minimum thickness for the required strength welded together at the edges to form continuous stiffening joints entirely closing the box against the entrance of dirt or water, and a reinforcing piece enclosed within the outer heavy end.

JOHN D. SOEHNER.
HENRY S. HOLMES.